(12) United States Patent
Miyata

(10) Patent No.: US 7,837,222 B2
(45) Date of Patent: *Nov. 23, 2010

(54) AIRBAG APPARATUS AND MOTORCYCLE HAVING THE SAME

(75) Inventor: Yasuhito Miyata, Tokyo (JP)

(73) Assignees: Takata Corporation, Tokyo (JP); Honda Motor Co., Ltd., Tokyo (JP)

( * ) Notice: Subject to any disclaimer, the term of this patent is extended or adjusted under 35 U.S.C. 154(b) by 239 days.

This patent is subject to a terminal disclaimer.

(21) Appl. No.: 11/470,939

(22) Filed: Sep. 7, 2006

(65) Prior Publication Data

US 2007/0052218 A1 Mar. 8, 2007

(30) Foreign Application Priority Data

Sep. 7, 2005 (JP) ............................. 2005-259986

(51) Int. Cl.
*B60R 21/20* (2006.01)
(52) U.S. Cl. ................................ 280/730.1; 280/743.2
(58) Field of Classification Search .............. 280/730.1, 280/743.2
See application file for complete search history.

(56) References Cited

U.S. PATENT DOCUMENTS

| | | | | |
|---|---|---|---|---|
| 5,280,953 | A * | 1/1994 | Wolanin et al. | 280/739 |
| 5,306,043 | A * | 4/1994 | Mihm et al. | 280/732 |
| 5,308,113 | A * | 5/1994 | Moriset | 280/743.2 |
| 5,362,101 | A * | 11/1994 | Sugiura et al. | 280/743.2 |
| 5,899,495 | A * | 5/1999 | Yamamoto et al. | 280/743.1 |
| 5,938,231 | A * | 8/1999 | Yamazaki | 280/730.1 |
| 5,967,545 | A * | 10/1999 | Iijima et al. | 280/730.1 |
| 6,007,090 | A | 12/1999 | Hosono et al. | |
| 6,793,245 | B2 * | 9/2004 | Luders et al. | 280/743.1 |
| 7,032,923 | B2 * | 4/2006 | Kurata et al. | 280/732 |
| 7,048,299 | B2 * | 5/2006 | Iijima et al. | 280/730.1 |
| 7,134,684 | B2 * | 11/2006 | Miyata | 280/730.1 |
| 7,293,793 | B2 * | 11/2007 | Miyata | 280/730.1 |
| 7,547,039 | B2 * | 6/2009 | Miyata | 280/730.1 |
| 7,614,657 | B2 * | 11/2009 | Miyata | 280/743.2 |
| 7,665,757 | B2 * | 2/2010 | Miyata | 280/728.2 |
| 7,686,328 | B2 * | 3/2010 | Miyata | 280/730.1 |
| 2002/0175511 | A1 * | 11/2002 | Dunkle et al. | 280/743.2 |

(Continued)

FOREIGN PATENT DOCUMENTS

EP 0 041 369 A1 12/1981

(Continued)

OTHER PUBLICATIONS

A search report dated Feb. 26, 2007, from the European Patent Office in corresponding European Application No. 06017554.4-2425.

*Primary Examiner*—Toan C. To
*Assistant Examiner*—Laura Freedman
(74) *Attorney, Agent, or Firm*—Fitch, Even, Tabin & Flannery

(57) ABSTRACT

A technique is provided effective in smoothing the airbag deploying motion of an airbag apparatus to be mounted to a motorcycle. In one form, an airbag apparatus mounted to a motorcycle is constructed to hold the loose portions of elongated webbings that join an airbag to the vehicle body in a predetermined bunched state as a folded portion while the airbag is housed, and to release the hold upon the deployment of the airbag.

15 Claims, 13 Drawing Sheets

U.S. PATENT DOCUMENTS

| | | |
|---|---|---|
| 2003/0214121 A1* | 11/2003 | Miyata et al. ............. 280/730.1 |
| 2004/0026904 A1* | 2/2004 | Yamazaki et al. ........ 280/730.1 |
| 2004/0150197 A1 | 8/2004 | Iijima et al. |
| 2004/0207189 A1* | 10/2004 | Miyata .................... 280/743.2 |
| 2004/0256848 A1* | 12/2004 | Miyata et al. ............ 280/743.2 |
| 2005/0040628 A1 | 2/2005 | Miyata |
| 2005/0127653 A1* | 6/2005 | Williams et al. ......... 280/743.2 |
| 2006/0071462 A1* | 4/2006 | Smith et al. ................ 280/739 |
| 2006/0192368 A1* | 8/2006 | Hall et al. ................. 280/730.2 |
| 2007/0052214 A1* | 3/2007 | Miyata .................... 280/730.1 |

FOREIGN PATENT DOCUMENTS

| | | |
|---|---|---|
| JP | 2002-137779 A | 5/2002 |
| JP | 2002 137779 A | 5/2002 |
| JP | 2002-137780 A | 5/2002 |
| JP | 2002 137780 A | 5/2002 |

\* cited by examiner

AIRBAG APPARATUS AND MOTORCYCLE HAVING THE SAME

FIELD OF THE INVENTION

The present invention relates to a technique of constructing an airbag apparatus to be mounted to a motorcycle.

BACKGROUND OF THE INVENTION

There have been various known techniques of restraining occupants of motorcycles with airbag apparatuses. For example, known techniques includes a technique of restraining an occupant with an airbag inflated by inflation gas in a frontal collision (e.g., refer to Japanese Unexamined Patent Application Publication No. 10-35564). The airbag apparatus disclosed in Japanese Unexamined Patent Application Publication No. 10-35564 has a structure in which the airbag apparatus and the vehicle body (body frame) are connected with a tether, and the tether extends with the deploying motion of the airbag to retain the airbag.

In the airbag apparatus described in Japanese Unexamined Patent Application Publication No. 10-35564, the tether is housed in position with part of the tether, that couples the airbag apparatus with the vehicle body, in a loose state before the activation of the airbag apparatus. With this arrangement, the tether is loosened irregularly when the airbag is housed. Accordingly, the extending motion of the tether from the loose state with the deployment of the airbag at a frontal collision may exert an influence on a desired deploying motion of the airbag.

SUMMARY OF THE INVENTION

The present invention has been made in view of the problem. Accordingly, it is an object of the invention to provide a technique effective in smoothing the deploying motion of an airbag mounted to a motorcycle.

In order to achieve the above object, the invention described in the claims is provided. Typically, the invention can be applied in constructing airbag apparatuses to be mounted to various motorcycles. In this specification, "a motorcycle," a typical example of vehicles, includes various saddle-type vehicles that an occupant straddles, such as touring motorcycles having a fuel tank in front of an occupant seat and motor scooters having a space between an occupant seat and a handlebar-supporting head pipe. In addition to the motorcycles, the "motorcycle" includes vehicles that occupants straddle and having three or more running wheels (e.g., three-wheel motorbikes for use in home delivery service and three- or four-wheel buggies for bad roads) and vehicles that occupants ride on and running by sledges or caterpillars, such as snow mobiles.

A first form of the present invention for solving the above-described problem is an airbag apparatus mounted to a motorcycle and includes at least gas generation device, an airbag, a plurality of tethering devices, and a holding device.

The gas generation device of the invention is a device for generating airbag inflation gas. The airbag of the invention restrains an occupant by deploying into an occupant restraining region in front of the occupant by the airbag inflation gas generated by the gas generation device in a frontal collision of the motorcycle. Here the "frontal collision" indicates that the motorcycle collides with a running or still front object such as a vehicle, a pedestrian, an obstacle or the like. The "occupant restraining region" is defined as a space extending in the direction of the forward movement of an occupant who is moving ahead of the motorcycle by a kinetic energy during a frontal collision, for restraining the occupant who is flung ahead of the motorcycle by the kinetic energy.

The plurality of tethers are elongated members that connect (tether) the airbag to the vehicle body. The tether may be an elongated member having a strength sufficient to retain the airbag to the vehicle body. The "elongated member" of the invention includes a belt and a strap, typically belt-like tether made of resin fibers or the like. This tether has the function of restricting the forward movement of the airbag by retaining the airbag to the vehicle body by the tension upon completion of the deployment of the airbag. The number of tethers of the invention may be varied to one or more as necessary.

Since the tether is in an irregularly loose state while the airbag is housed, the extending motion of the tether from the loose state with the inflation of the airbag at a frontal collision of the motorcycle may exert an influence on a desired deploying motion of the airbag. Therefore, the invention has a holding device for the tethers.

The holding device of the invention holds the loose portions of at least two of the plurality of tethers in the same bunched state while the airbag is housed, and releases the hold upon the deployment of the airbag. The "same bunched state" can be achieved by piling (folding back) the loose portions of the tethers by the same number of times in the same direction, or by winding up the loose portions by the same number of times in the same winding direction. The "hold" here is sufficient if the loose portions of the tethers can be temporarily held in a predetermined bunched state. The "releasing the hold" is sufficient if the hold in a predetermined bunched state is released in synchronization with the deployment of the airbag or using the deploying force of the airbag. The holding device therefore may use a hook-and-loop fastener at the opposing surfaces of the loose portion of each tether, a stitching structure of detachably sewing up the loose portion of each tether with a tear seam or the like; or a binding structure of detachably binding (winding up) the loose portion of each tether with an adhesive tape or a hook-and-loop fastener. With such an arrangement, when the at least two tethers whose loose portions are held in the same bunched state are extended from the loose state with the deployment of the airbag, the extending motion is smoothed by the holding device, thus preventing the airbag from leaning to the right or left side.

Thus the arrangement of the airbag apparatus according to the first form of the invention can smooth the deploying motion of the airbag.

A second form of the invention for solving the above-described problem is an airbag apparatus wherein the holding device of the first form of the invention holds the loose portions of at least two of the plurality of tethers symmetrically. With such an arrangement, the right and left tethers are extended substantially evenly from the loose state with the deployment of the airbag, so that the load of the right and left tethers applied on the airbag can be made substantially equal, thus enabling the airbag to be deployed laterally evenly in balance.

Thus the arrangement of the airbag apparatus according to the second form of the invention can further smooth the deploying motion of the airbag.

A third form of the invention for solving the above-described problem is an airbag apparatus wherein the holding device of the first or second form of the invention holds the loose portions of at least two of the plurality of tethers with a hook-and-loop fastener that freely sticks and peels the opposing surfaces of the loose portions of the tethers via a pile structure. The use of this hook-and-loop fastener enables the opposing surfaces of the loose portions of the tethers to be freely stuck or peeled off, thus allowing reuse. Thus the arrangement is economical.

Accordingly, the arrangement of the airbag apparatus according to the third form of the invention can smooth the deploying motion of the airbag, and achieve a reasonable holding device.

A fourth form of the invention for solving the above-described problem is an airbag apparatus including at least gas generation device, an airbag, a single tether, and a holding device.

The gas generation device and the airbag of the invention have the same structure as that of the gas generation device and the airbag of the airbag apparatus described in the first form of the invention. The single tether is an elongated member that joins the airbag with the vehicle body. The holding device holds the loose portion of the tether in a predetermined bunched state while the airbag is housed, and releases the hold upon the deployment of the airbag. The holding device of the invention uses at least one of a hook-and-loop fastener that freely sticks and peels the opposing surfaces of the loose portion via a pile structure, a stitching portion detachably sewing up the loose portion; and a binding portion detachably binding the loose portion. The "predetermined bunched state" here is achieved by piling (folding back) the loose portion of the single tether or by winding up the loose portion of the single tether. With this arrangement, the extending motion of the single tether, whose loose portion is held in a predetermined bunched state, from the loose state can be smoothed by the holding device, preventing the tether from restricting the deploying motion of the airbag.

Thus the arrangement of the airbag apparatus according to the fourth form of the invention can smooth the deploying motion of the airbag.

A fifth form of the invention for solving the above-described problem is a motor cycle with an airbag apparatus according to one of the first, second, third, or fourth forms of the invention.

Thus, the fifth form of the invention can provide a motorcycle having an airbag apparatus capable of smoothing the deploying motion of the airbag.

The airbag apparatus to be mounted to a motorcycle according to the present invention is arranged such that the loose portion of the tether that joins the airbag to the vehicle body is held in a predetermined bunched state while the airbag is housed, and that the use of the holding device that releases the hold upon deployment of the airbag prevents the motion of the tether whose loose portion is released by the holding device from exerting an influence on a desired deploying motion, thereby smoothing the deploying motion of the airbag.

DETAILED DESCRIPTION OF THE PREFERRED EMBODIMENTS

Figure 1:
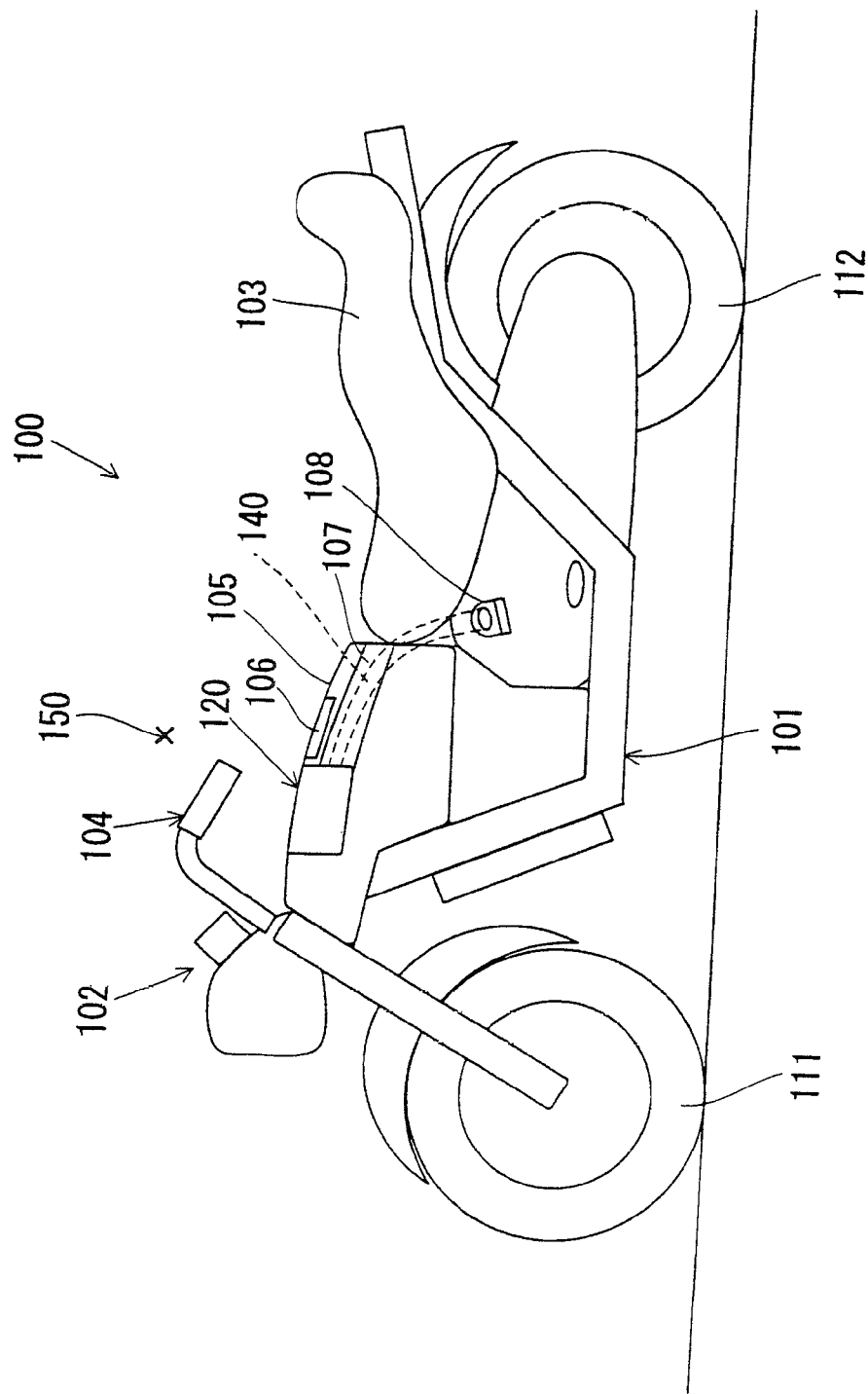
FIG. 1 is a side view of a motorcycle 100 according to an embodiment of "a motorcycle" of the invention, showing a state in which an airbag apparatus 120 is mounted to the motorcycle 100.
Figure 2:
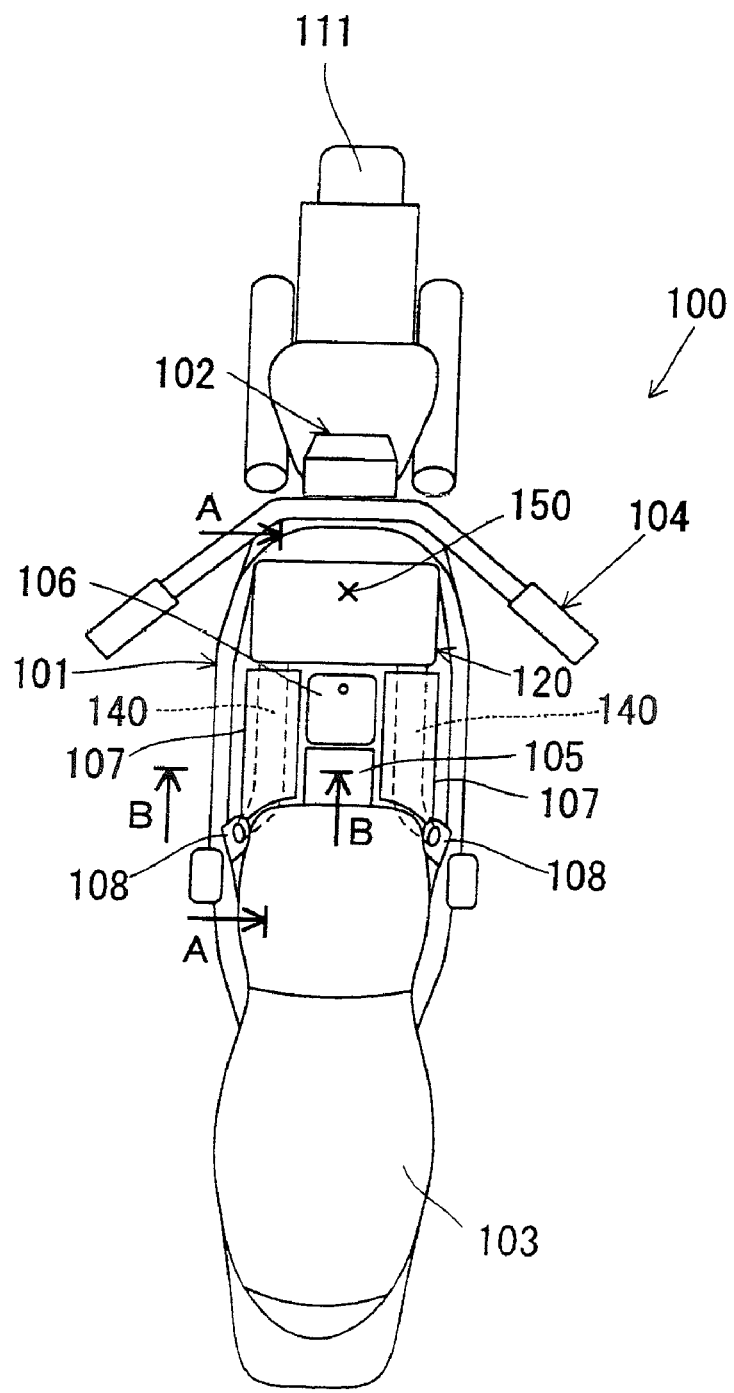
FIG. 2 is a diagram showing the motorcycle 100 in FIG. 1 as viewed from the top thereof.

An embodiment of the present invention will be described specifically with reference to the drawings. Referring first to FIGS. 1 and 2, the entire structure of a motorcycle 100 will be described. FIG. 1 is a side view of the motorcycle 100 according to an embodiment of the invention, showing a state in which an airbag apparatus 120 is mounted to the motorcycle 100. FIG. 2 shows the motorcycle 100 of FIG. 1, viewed from the top of the vehicle. The motorcycle 100 of the embodiment is an example of "a motorcycle" or "a motorcycle vehicle" of the invention.

Referring to FIGS. 1 and 2, the motorcycle 100 is what is called a touring motorcycle and mainly comprises a body frame 101 including an engine and a main frame; a seat 103 that occupants can straddle; handlebars 104; a front wheel 111; and a rear wheel 112.

A region above the body frame 101 of the motorcycle 100 and in front of an occupant seated in the seat 103 is defined as an occupant restraining region 150 in the event of a frontal collision of the motorcycle 100. The "frontal collision" in the embodiment indicates that the motorcycle 100 collides with various front objects (e.g., a vehicle, a pedestrian, an obstacle, and a guardrail, not shown for convenience sake). The "occupant restraining region 150" of the embodiment corresponds to "an occupant restraining region" of the invention, which is defined as a space extending in the direction of the forward movement of an occupant seated in the seat 103 during a frontal collision, for restraining the occupant who is flung ahead of the motorcycle by a kinetic energy.

A front portion 102 of the body frame 101 includes a headlight, various meters, switches, a windshield, and the like. A fuel tank 106 is disposed at the front of a body component 105 between the front portion 102 and the seat 103. The airbag apparatus (also referred to as an airbag module) 120 is disposed in front of the fuel tank 106. Webbing covers 107 for covering a pair of right and left webbings 140 that is a component of the airbag apparatus 120 are disposed on both sides of the fuel tank 106. The webbings 140 cannot or hardly be seen from the exterior owing to the covering by the webbing covers 107 in a normal state in which the airbag apparatus 120 is inoperative. The webbings 140 will be specifically described later in the description of the airbag apparatus 120.

The structure of the airbag apparatus 120 of this embodiment will be specifically described with reference to FIGS. 3 to 14. The airbag apparatus 120 is disposed so as to face the occupant restraining region 150 for the occupant seated in the seat 103. The airbag apparatus 120 corresponds to "an airbag apparatus" of the invention.

Figure 3:
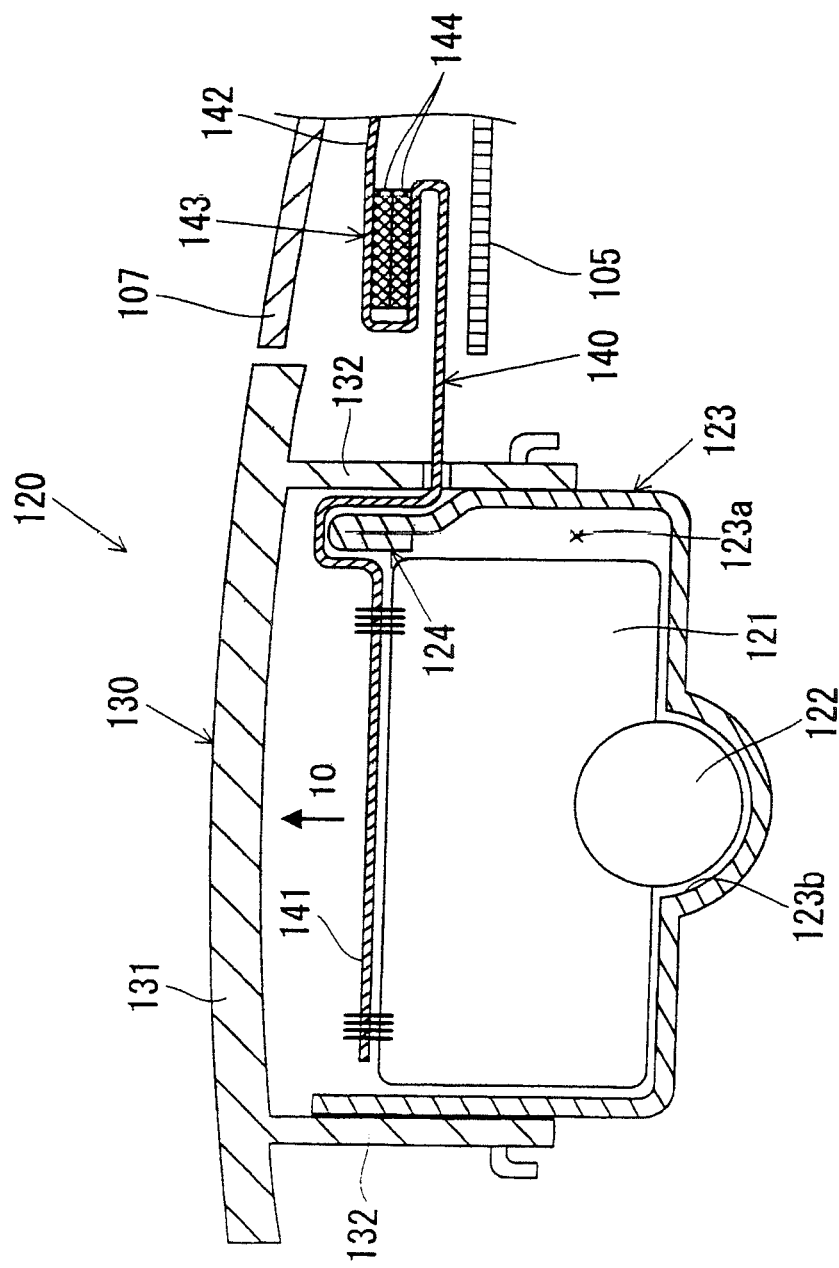
FIG. 3 is a sectional view of the motorcycle 100 in FIG. 2 taken along line A-A.
Figure 4:
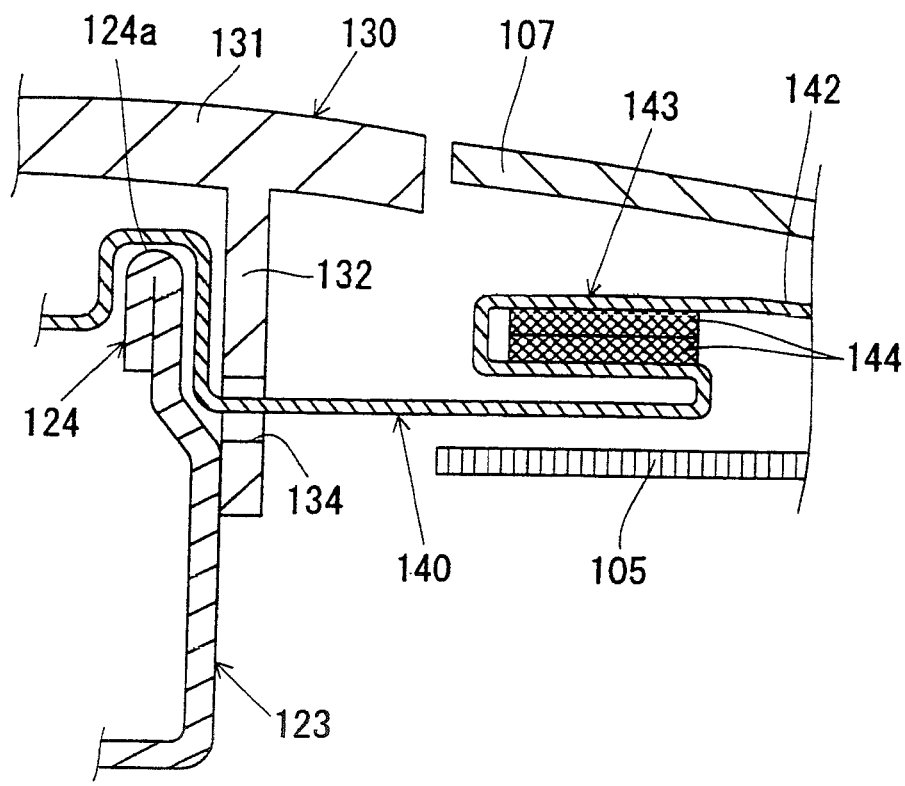
FIG. 4 is a fragmentary enlarged view of FIG. 3.
Figure 5:
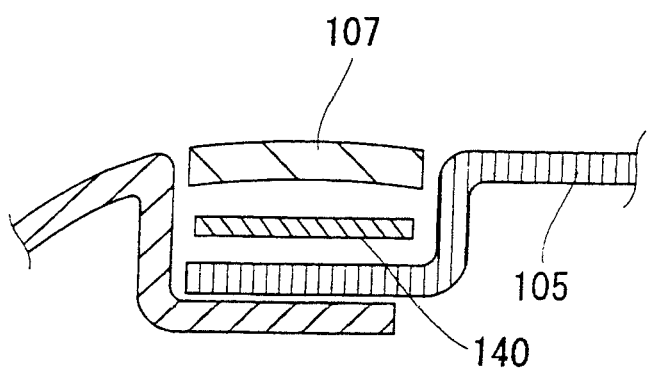
FIG. 5 is a cross sectional view of the motorcycle 100 taken along line B-B in FIG. 2.

FIG. 3 is a sectional view of the motorcycle 100 in FIG. 2 taken along line A-A; FIG. 4 is a fragmentary enlarged view of FIG. 3; and FIG. 5 is a cross sectional view of the motorcycle 100 taken along line B-B in FIG. 2. As shown in FIGS. 3 and 4, the airbag apparatus 120 mainly comprises an airbag 121, an inflator 122, a retainer 123, a module cover 130, and the webbings 140.

The airbag 121 is housed in the retainer 123 in a predetermined folded state (like a bellows or a roll). In FIG. 3, the direction of the inflation (deployment) of the airbag 121 is indicated by arrow 10. The airbag 121 is made of a material similar to airbag cloth for cars. The airbag 121 corresponds to "an airbag" of the invention.

The inflator 122 is a gas supply device that generates airbag inflation gas and supplies it into the airbag 121 at a vehicle collision so that the airbag 121 in a folded state inflates while deploying from the retainer 123. The inflator 122 corresponds to "an inflator" of the invention.

The retainer 123 is shaped like a bottomed box having at least an airbag housing 123a for the airbag 121 and an inflator housing (recess) 123b for the inflator 122. The retainer 123 houses the airbag 121 and has an opening (airbag opening) at the top, which allows the deployment of the airbag 121. The retainer 123 is typically formed by pressing a metallic material.

In this embodiment, the webbings 140, to be described later, extend from the interior of the retainer 123 to the exterior. Accordingly, the webbings 140 may be locally worn down by contact with the retainer 123 when the vehicle vibrates during traveling, when the webbings 140 are retracted from the housing for maintenance, and when the webbings 140 are extended from a loose state with the deployment of the airbag 121. The retainer 123 of the embodiment therefore has a bent portion 124 at the portion with which the webbing 140 may come into contact. The bent portion 124 has a smooth surface (a smooth surface 124a in FIG. 4) at the upper end of the metal-plate retainer 123. The smooth surface 124a is formed by folding back (bending) the upper end (plate end) of the retainer 123. The smooth surface 124a is an arc-shaped smooth surface (arcuate surface) corresponding to part of a circle or ellipse and as such, and it has a function of reducing the sliding resistance between the contact portion of the retainer 123 and the webbings 140 to enable smooth sliding.

Specifically, the smooth surface 124a is shaped to allow the movement of the webbings 140 while maintaining surface contact with the webbings 140 in the moving direction of the webbings 140 when the vehicle vibrates, when the webbings 140 are retracted for maintenance, and when the webbings 140 are moved with the deployment of the airbag 121. At that time, the curvatures of the webbings 140 and the smooth surface 124a are substantially equal at the region where the webbings 140 and the smooth surface 124a are in contact. In other words, the smooth surface 124a serves to guide the webbings 140 relative to the retainer 123 while maintaining the surface contact so as to agree the curvature of the webbings 140 with the curvature of the smooth surface 124a.

This arrangement can prevent the wear of the webbings 140 made of, e.g., fibers due to contact with the metallic retainer 123 by use of the smooth surface 124a of the bent portion 124. Since, in this embodiment, the retainer 123 itself in contact with the webbings 140 has the smooth surface 124a, the smoothing structure is simplified, thus decreasing the number of components. It is preferable to increase the surface area of the smooth surface 124a of the bent portion 124 to thereby disperse the local frictional force to the webbings 140. A more detailed description of the retainer 123 will be given hereinlater.

The module cover 130 covers the opening (airbag opening) of the retainer 123 from above to thereby cover the airbag 121, and has at least a top plate 131 and an erect portion 132. The module cover 130 is typically molded of a resin material.

The top plate 131 extends substantially horizontally in the direction of the opening surface at the airbag opening region of the retainer 123 to thereby form the upper surface of the airbag apparatus 120. The erect portion 132 is a plate portion and extends vertically from the lower surface (back) of the top plate 131 toward the retainer 123 to cross the extending direction of the top plate 131. The erect portion 132 is secured to the retainer 123 with fixing portions (fixtures 128, to be described later) of the retainer 123 to thereby join the module cover 130 and the retainer 123 together.

Referring to FIG. 4, a pair of right and left through holes 134 that communicate the interior of the module cover 130 with the exterior is provided at the part of the rising portion 132 adjacent to the rear of the vehicle (adjacent to the occupant). The webbings 140, to be described later, can extend from the interior to the exterior of the module cover 130 through the through holes 134. When the top plate 131 receives the deploying force of the airbag 121 at a vehicle collision, the module cover 130 is torn open along a tear line 133 and two tear lines 135, to be described later, of the erect portion 132, to release the covering of the opening (airbag opening) of the retainer 123. This enables the deployment of the airbag 121. A more detailed description of the module cover 130 will be given hereinlater.

In this embodiment, the airbag 121 is tethered to the body of the motorcycle 100 with the pair of right and left elongated webbings 140. The webbings 140 are formed like a belt made of the same material as that of car seatbelts (resin fiber belt) or the same material as that of airbag cloth. The webbings 140 may be formed like a strap instead of the belt. A first end 141 of each webbing 140 is stitched to the airbag 121 and a second end 142 is joined to a fastener (a fastener 108 in FIGS. 1 and 2) on the body. In other words, the webbings 140 extend in the front and back direction in parallel at two positions between the airbag apparatus 120 and the vehicle body. As shown in FIGS. 4 and 5, when the airbag apparatus 120 is in an inoperative state, the webbings 140 extend in the housing space between the webbing covers 107 and the body component 105, and the upper parts of the webbings 140 are covered with the webbing covers 107. The webbings 140 correspond to the tether of the invention.

Since the webbings 140 are in an irregularly loose state while the airbag is housed, the extending motion of the webbings 140 from the loose state with the deployment of the airbag at a frontal collision of the vehicle may exert an influence on a desired deploying motion of the airbag 121. Therefore, in the embodiment, each webbing 140 has a folded portion 143 below the webbing cover 107 so as to keep the looseness of the webbing 140 in a predetermined bunched state before the activation of the airbag apparatus 120 (while the airbag 121 is housed). The loose portions at the folded portions 143 of the webbings 140 are piled (folded back) by the same number of times in the same direction. The opposing surfaces of the loose portion are provided with a hook-and-loop fastener 144 that can temporarily hold the loose portion in the folded state (corresponding to "the same bunched state). The hook-and-loop fastener 144 serves as "tether" and "a hook-and-loop fastener" of the invention.

The hook-and-loop fastener 144 has a known structure, which is a detachable tape using a pile structure and is the so-called Velcro fastener. Specifically, the hook-and-loop fastener 144 has small mushroom-shaped expanded portions (or hooks) on one surface, and loops on the other surface. When the two surfaces are put together, the mushroom portions (or hooks) are caught (hooked) in the loops, so that they easily stick to each other; when they are pulled from each other, the mushrooms come out from the loops, so that they are easily peeled from each other.

With such a structure, the folded (bunched) state of the folded portion 143 while the airbag is housed can temporarily be kept by the hook-and-loop fastener 144. On the other hand, when a predetermined tensile load is applied to the webbings 140 at the deployment of the airbag 121, the retaining force by the hook-and-loop fastener 144 is released, so that the folded (bunched) state of the folded portion 143 is released. Accordingly, the webbings 140 whose loose portions are bunched in advance extend from the loose state with the deployment of the airbag 121. This prevents the motion of the webbings 140 from exerting an influence on a desired deployment of the airbag 121.

Figure 6:
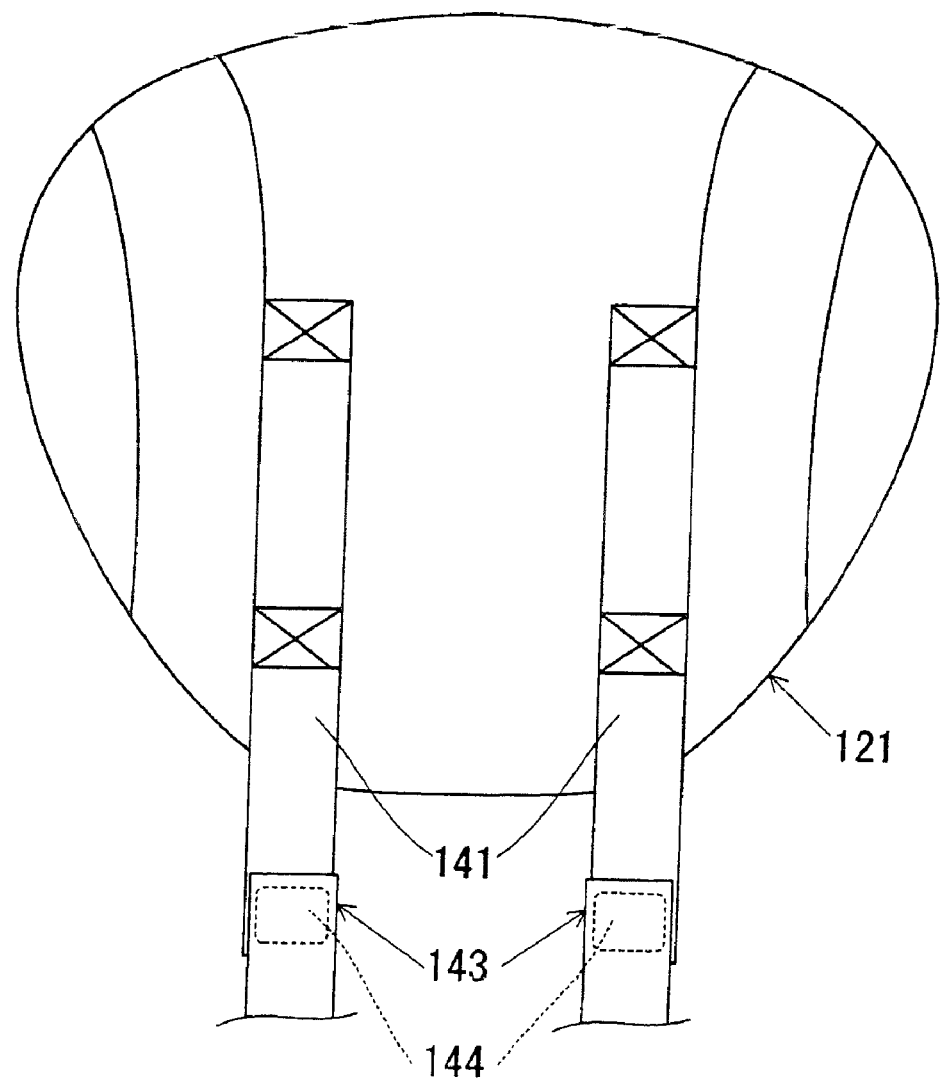
FIG. 6 shows the structure of folded portions 143 of webbings 140 of the embodiment.

FIG. 6 shows the structure of the folded portions 143 of the webbings 140 of the embodiment. As shown in FIG. 6, in this embodiment, the folded portions 143 that are temporarily retained with the hook-and-loop fastener 144 are disposed substantially symmetrically. This arrangement can reduce the looseness of the webbings 140 while the airbag is housed and makes the loads of the right and left webbings 140, which extend at the deployment of the airbag 121, on the airbag 121 substantially equal, thus being effective in deploying the airbag 121 laterally equally.

For the webbing holding structure, the embodiment can employ another webbing holding device other than the hook-and-loop fastener 144, provided that the folded state of the folded portions 143 can temporarily be held. For example, the folded state of the folded portions may be temporarily kept by a structure in which the folded portions are detachably stitched up with a tear seam or a structure in which the folded portions are detachably bound (wound) by an adhesive tape or the like. At that time, an appropriate structure can be adopted for temporarily holding the loose portions of the webbings 140 in a predetermined folded state (a predetermined folded-back state) or in a predetermined wound state with a webbing holding device.

Figure 7:
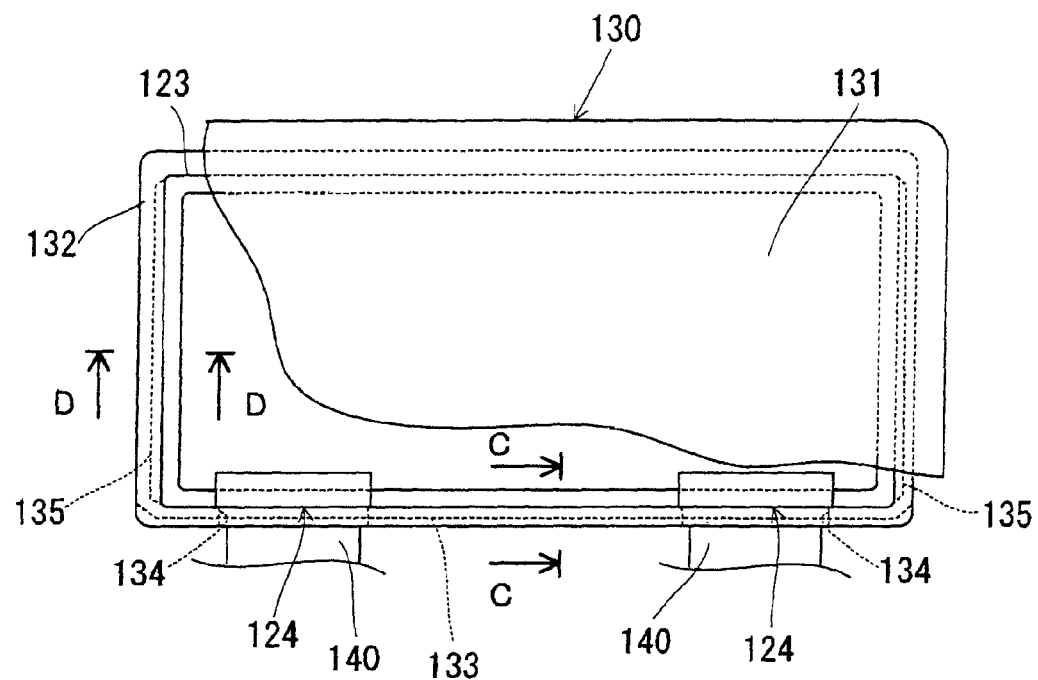
FIG. 7 shows a module cover 130 and a retainer 123 of the embodiment viewed from the top of the vehicle.
Figure 8:
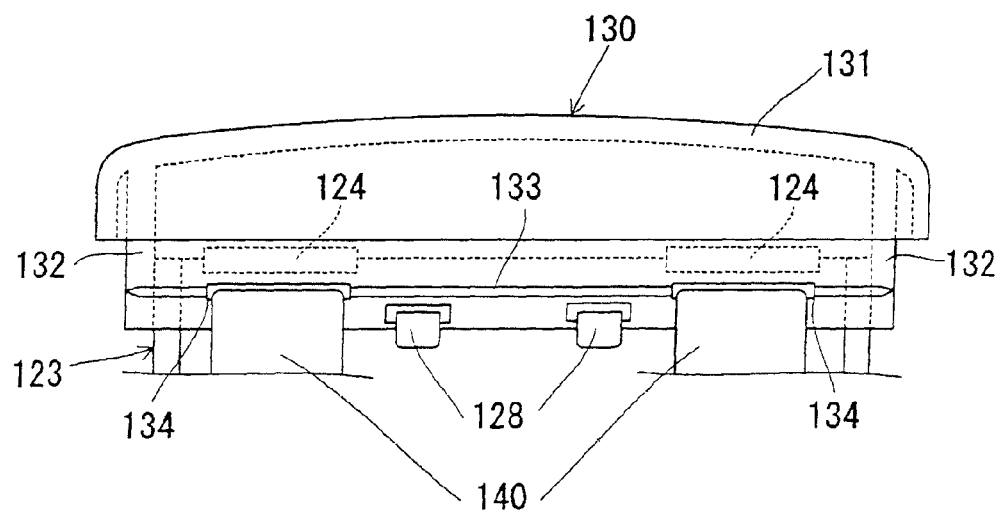
FIG. 8 shows the module cover 130 and the retainer 123 from the rear of the vehicle.
Figure 9:
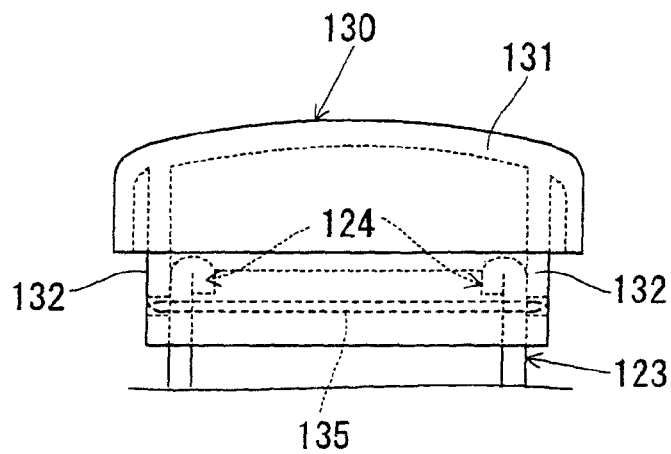
FIG. 9 shows the module cover 130 and the retainer 123 from the side of the vehicle.
Figure 10:
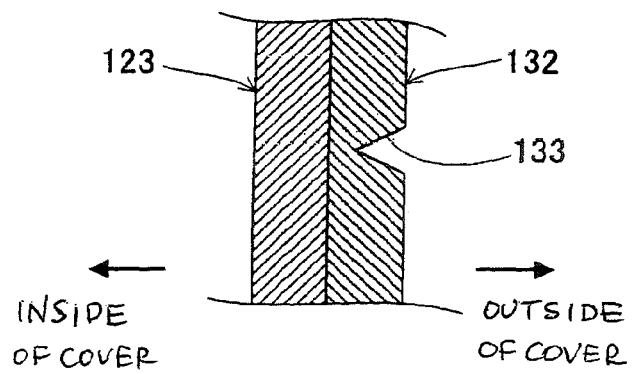
FIG. 10 shows a section taken along line C-C in FIG. 7.
Figure 11:
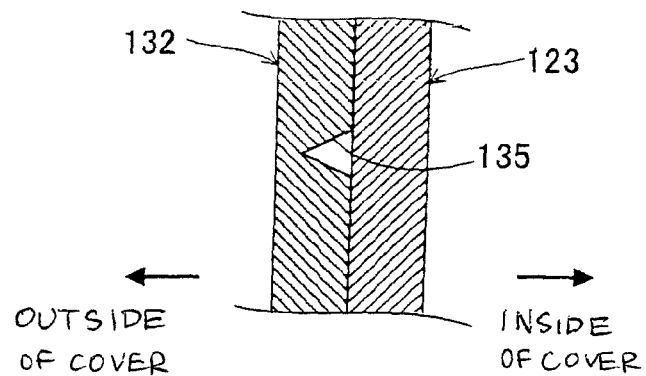
FIG. 11 shows a section taken along line D-D in FIG. 7.

Referring to FIGS. 7 to 11, a more detailed description of the module cover 130 will be given. FIG. 7 shows the module cover 130 and the retainer 123 of the embodiment viewed from the top of the vehicle; FIG. 8 shows them from the rear of the vehicle; FIG. 9 shows them from the side of the vehicle; FIG. 10 shows a section taken along line C-C of FIG. 7; and FIG. 11 shows a section taken along line D-D of FIG. 7.

As shown in FIGS. 7 to 9, the erect portion 132 of the module cover 130 of the embodiment has a tear line 133 along the outer periphery thereof adjacent to the rear of the vehicle (adjacent to the occupant), and two tear lines 135 along the inner periphery on both sides. In this embodiment, the tear lines 133 and 135 are provided not to the top plate 131 but to the erect portion 132. Accordingly, even if a load such as an occupant or a burden is applied from above the module cover 130, the load is not directly applied to the tear lines 133 and 135, thus preventing the module cover 130 from being torn open along the tear lines 133 and 135. The embodiment may have a continuous tear line from the erect portion 132 of the module cover 130 across another portion of the top plate 131.

The disposition of the through holes 134 on the tear line 133 streamlines the structure because the installation locations are shared.

As shown in FIGS. 10 and 11, the tear lines 133 and 135 are formed by providing triangular cutouts in the erect portion 132. Thus three continuous grooves with a predetermined depth, or thin portions of a substantially even thickness within the thickness of the erect portion 132 are formed in the erect portion 132 adjacent to the rear and both sides of the vehicle. Thus the tear lines 133 and 135 are also referred to as "linear grooves", "thin portions", or "fragile portions" having a linear groove of a predetermined depth. Since the thickness at the tear lines 133 and 135 (the thickness of the thin portions) is appropriately set on the basis of the specifications of the airbag 121, such as a deploying force, the module cover 130 can be smoothly torn open along the tear lines 133 and 135 of the erect portion 132 by the deploying force of the airbag 121 in the event of a vehicle accident, so that the portion of the module cover 130 above the tear lines 133 and 135 deploys toward the front of the vehicle with the portion of the erect portion 132 adjacent to the front of the vehicle as the hinge. At that time, the portion of the cover lower than the tear lines 133 and 135 is secured to the retainer 123 when the tear lines 133 and 135 are torn open or the airbag 121 deploys such that fasteners 128 on the retainer 123 are hooked in the through holes of the erect portion 132 or fixed with rivets (refer to FIG. 8). The tear lines may be continuous grooves of a specified depth disposed at regular intervals, continuous perforations, or continuous slits disposed at regular intervals, instead of the continuous groove of a predetermined depth.

The cutoffs of the tear lines 133 and 135 of the embodiment may be formed in dies during the molding of the module cover, or alternatively, may be formed by post machining such as laser beam machining or ultrasonic machining after the molding of the module cover. The sections of the tear lines 133 and 135 may be varied to a triangle, a semicircle, etc. as appropriate. The tear line 133 may be formed along the inner circumference of the erect portion 132 adjacent to the rear of the vehicle (adjacent to the occupant), while the tear lines 135 may be formed along the outer circumference of the both sides of the erect portion 132.

Figure 12:
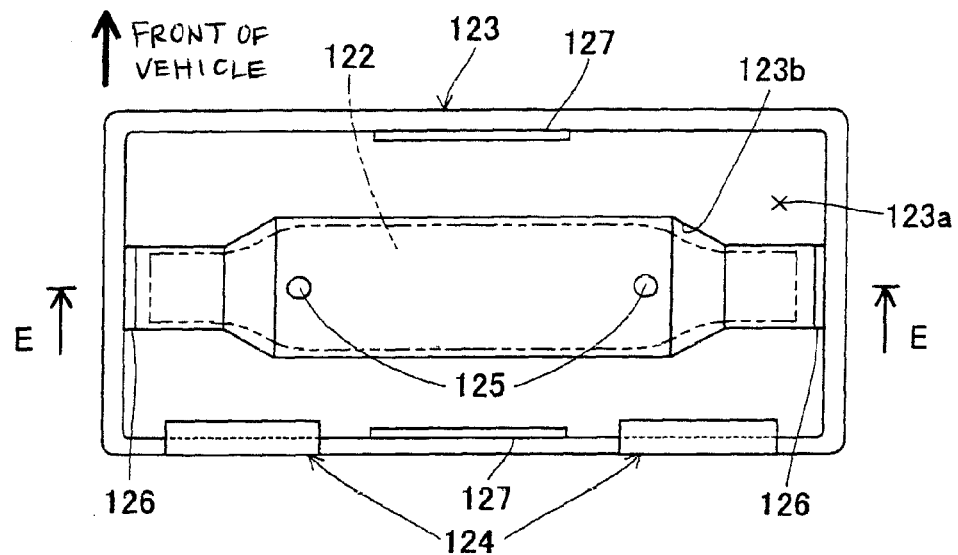
FIG. 12 shows the retainer 123 of the embodiment viewed from the top of the vehicle.
Figure 13:
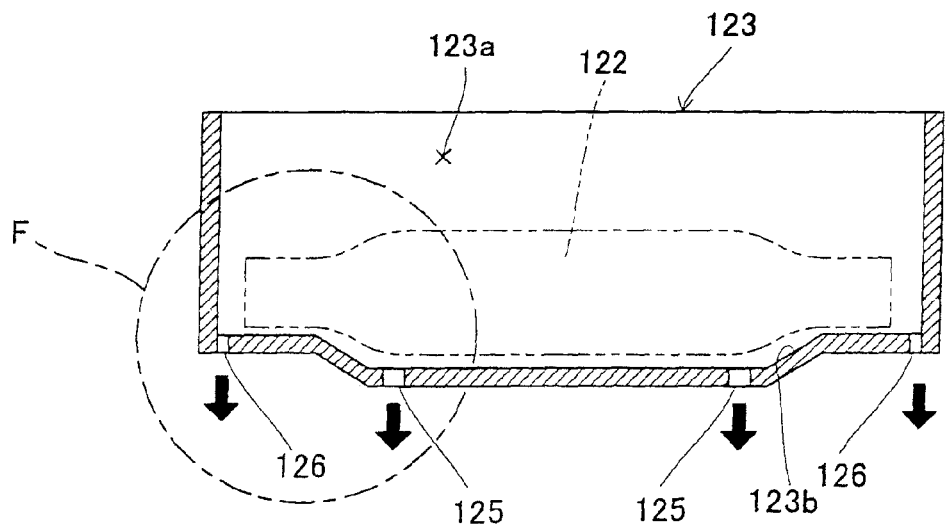
FIG. 13 shows a section taken along line E-E in FIG. 12.
Figure 14:
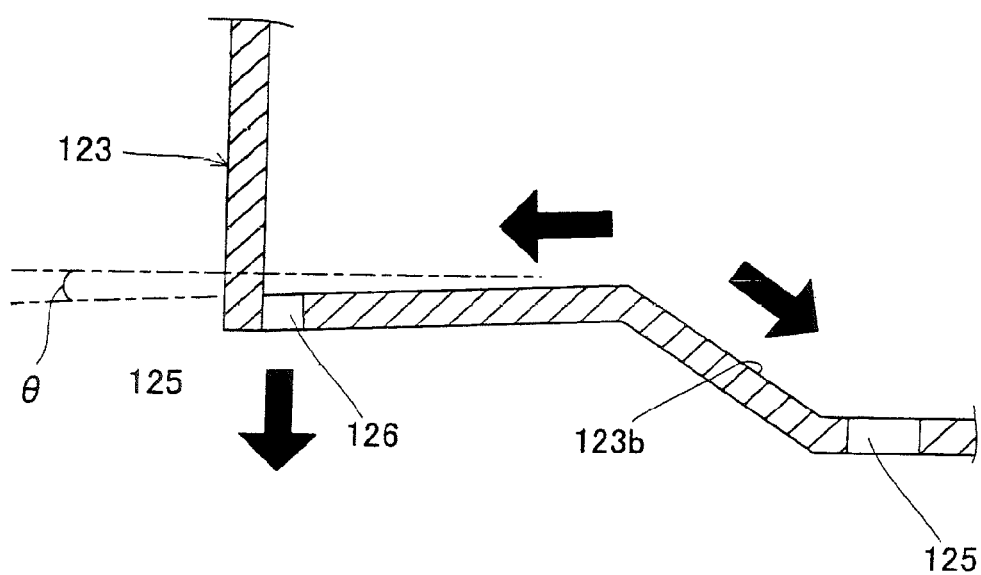
FIG. 14 is an enlarge view of part F in FIG. 13.

Referring then to FIGS. 12 to 14, a more detailed structure of the retainer 123 will be presented. FIG. 12 shows the retainer 123 of the embodiment viewed from the top of the vehicle; FIG. 13 shows a section taken along line E-E of FIG. 12; FIG. 14 shows an enlarged view of part F in FIG. 13.

As shown in FIGS. 12 and 13, the retainer 123 of the embodiment has a pair of hole-like first through portions 125 at an inflator housing 123b at the bottom of the retainer 123, a pair of slit-like second through portions 126 at the right and left ends, and a pair of slit-like third through portions 127 at the front and rear ends. The first through portions 125, the second through portions 126, and the third through portions 127 extend vertically through the bottom of the retainer 123, and have a function of draining water entering the retainer 123 to the outside of the retainer 123. Thus, the water entering the retainer 123 is continuously or intermittently drained through the first through portions 125, the second through portions 126, and the third through portions 127 to the outside of the retainer 123 by gravitation.

Since the housing like the retainer 123 of the embodiment is a bottomed box having an airbag opening on the top, liquid such as water or oil may be prone to enter or reside in the housing through the periphery of the airbag opening even with high tightness. Particularly, general motorcycles have an airbag apparatus exposed to the outside of the vehicle body in contrast to cars, so that such a problem may be pronounced under the influence of rain, cleaning water, and humidity. Accordingly, the embodiment has the first through portions 125, the second through portions 126, and the third through portions 127 for drainage at the bottom of the retainer 123. Of course, liquids such as oil entering the retainer 123 other than water may be drained from the retainer 123 through the first through portions 125, the second through portions 126, and the third through portions 127. The through portion for drainage may be holes, slits, mesh, a punching plate, or other openings. In this embodiment, the installation locations and the number of installation locations of the draining through portion may be varied as appropriate.

The first through portions 125 are located at the recessed inflator housing 123b, which is the lowest of the bottom of the retainer 123. More specifically, the bottom of the retainer 123 has a downward slope (curved slope) toward the first through portions 125. Accordingly, the water entering the retainer 123 is collected to the first through portions 125 along the slope of the inflator housing 123b, and is surely drained through the first through portions 125 to the outside of the retainer 123.

On the other hand, the second through portions 126 have the function of draining the water, which enters the retainer 123 and resides at the right and left ends thereof to the outside of the retainer 123 when the motorcycle 100 is parked at an angle using a side stand, or when the vehicle body tilts laterally during driving. Furthermore, as shown in FIG. 14, the bottom of the retainer 123 decreases in height toward the second through portions 126 (at an inclination angle θ). In other words, the bottom of the retainer 123 has a downward slope (linear slope) toward the second through portions 126. Thus, the water entering the retainer 123 is collected to the second through portions 126 along the slope of the bottom of the retainer 123 when the vehicle body tilts and even when the vehicle body is in a horizontal position, and is surely drained through the second through portions 126 to the outside of the retainer 123. Particularly, since the second through portions 126 are disposed at the right and left ends of the retainer 123, the second through portions 126 easily become the lowest of the bottom of the retainer 123 when the motorcycle tilts to the right or left side, thus increasing the draining function. Motorcycles tilt to the right or left when parked at a rightward or leftward inclination, or when tilted to the right or left during driving on a right or left curve. The inclination angle θ of the bottom of the retainer 123 may be appropriately set according to the specifications of the retainer 123.

Furthermore, the third through portions 127 have the function of draining the water intruding into the retainer 123 and residing at the front and rear end. For example, the motorcycle 100 tilts on an upward slope or downward slope run because the front of the body becomes higher or lower than the rear. In this embodiment, the third through portion 127 on the front or rear side easily becomes the lowest of the bottom of the retainer 123, so that the water in the retainer 123 is surely drained from the retainer 123 through the third through portion 127. Vehicles tilt to the front or rear during running on an uphill or downhill slope or when the retainer 123 itself is combined to the body on a slant.

Preferably, for the draining structure of the embodiment in view of the surface tension of water, the first through portions 125 have a hole diameter of 7 mm or more (38 mm2 or more in section area), and the second through portions 126 and the third through portions 127 have the same section area as that of the first through portions 125 or the same slit width as the hole diameter of the first through portions 125.

Figure 15:
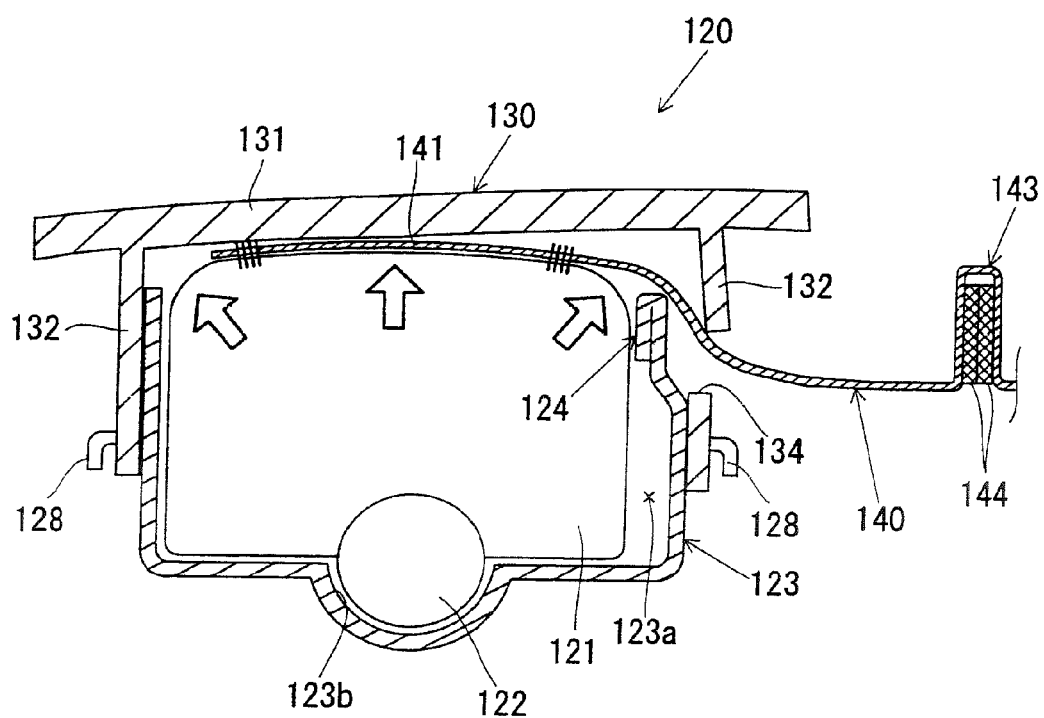
FIG. 15 shows the state of an airbag 121 of the airbag apparatus 120 at the start of inflation.
Figure 16:
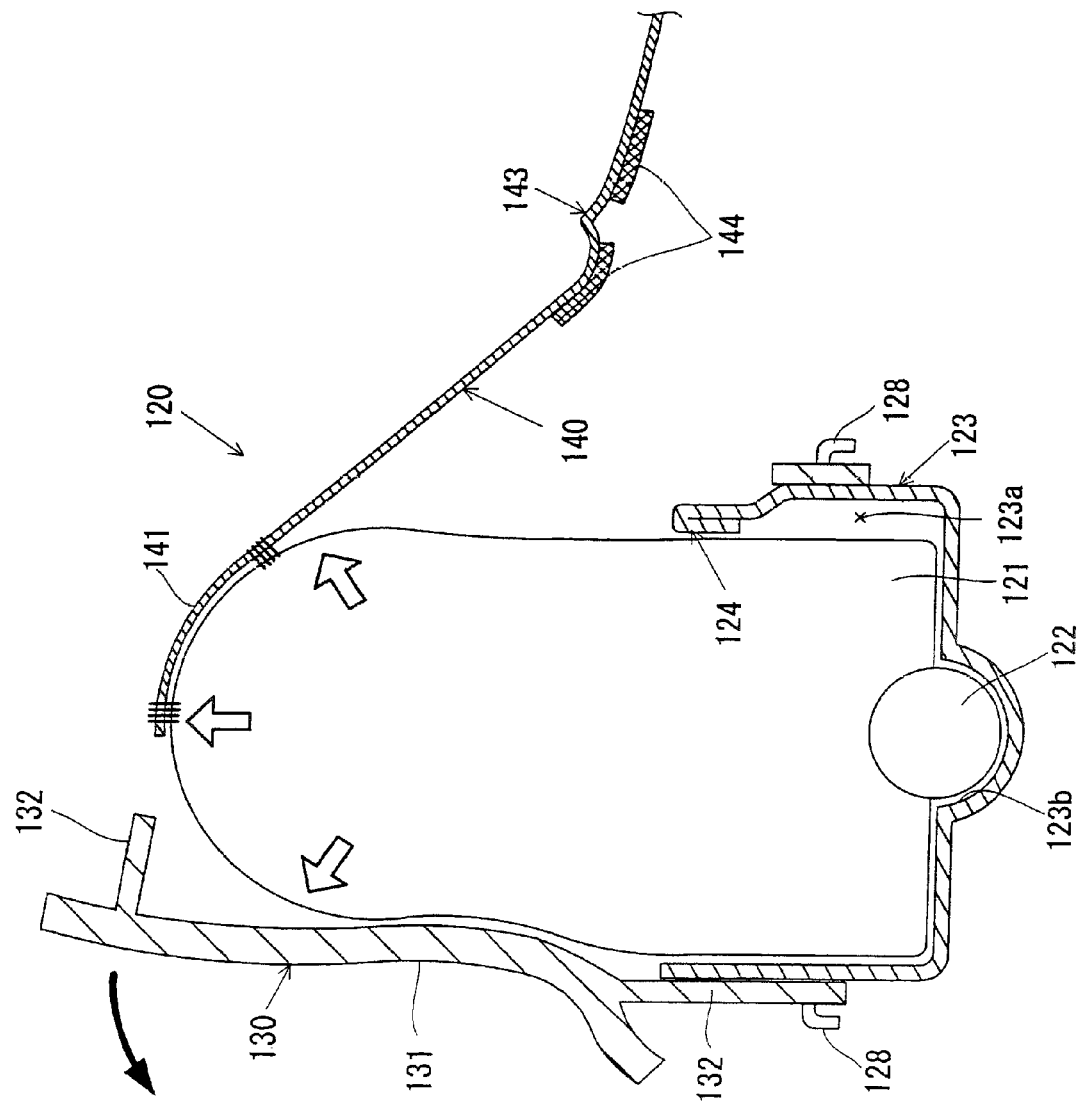
FIG. 16 shows the airbag 121 at the middle of inflation.
Figure 17:
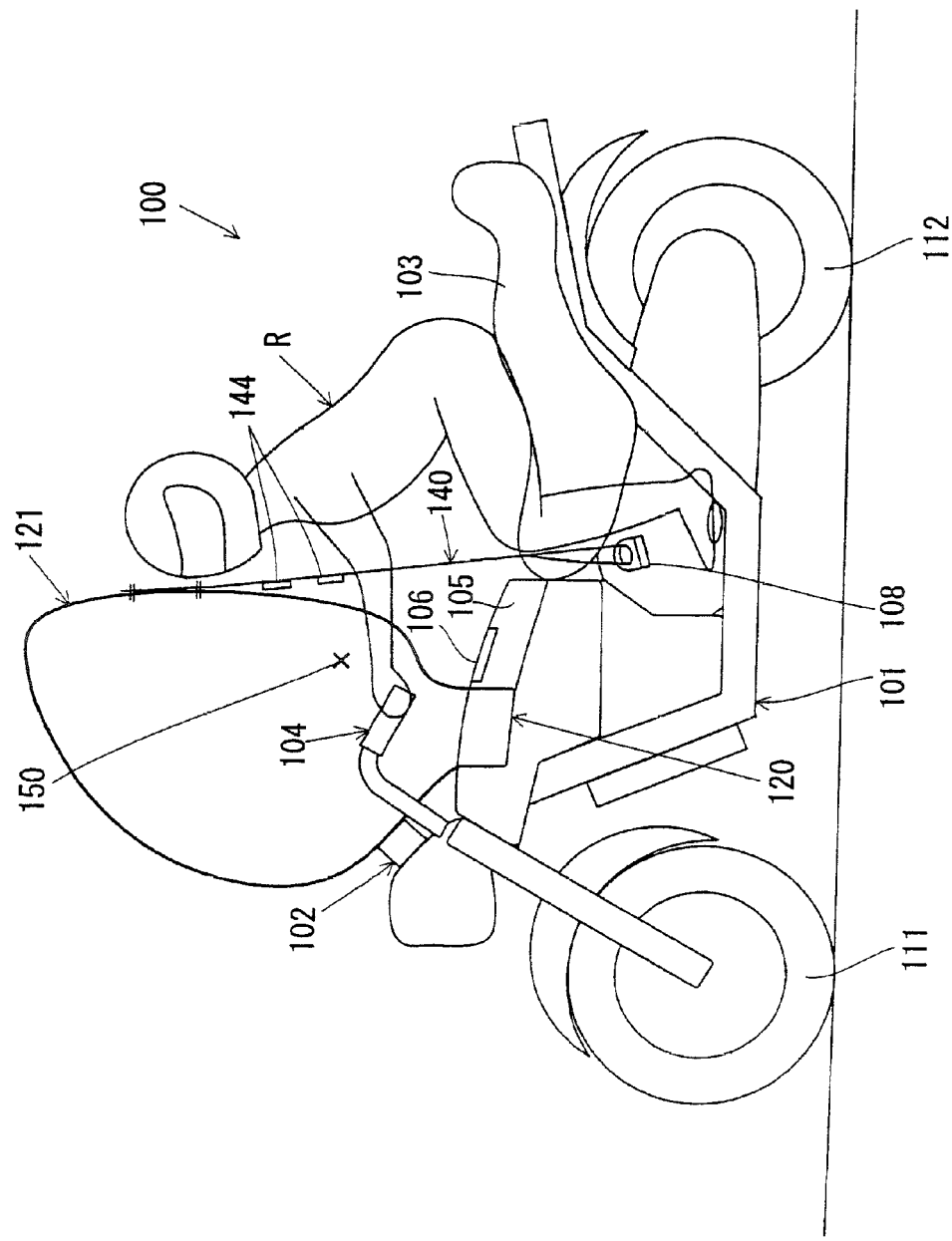
FIG. 17 shows the airbag 121 at the completion of inflation, as viewed from the side of the vehicle.
Figure 18:
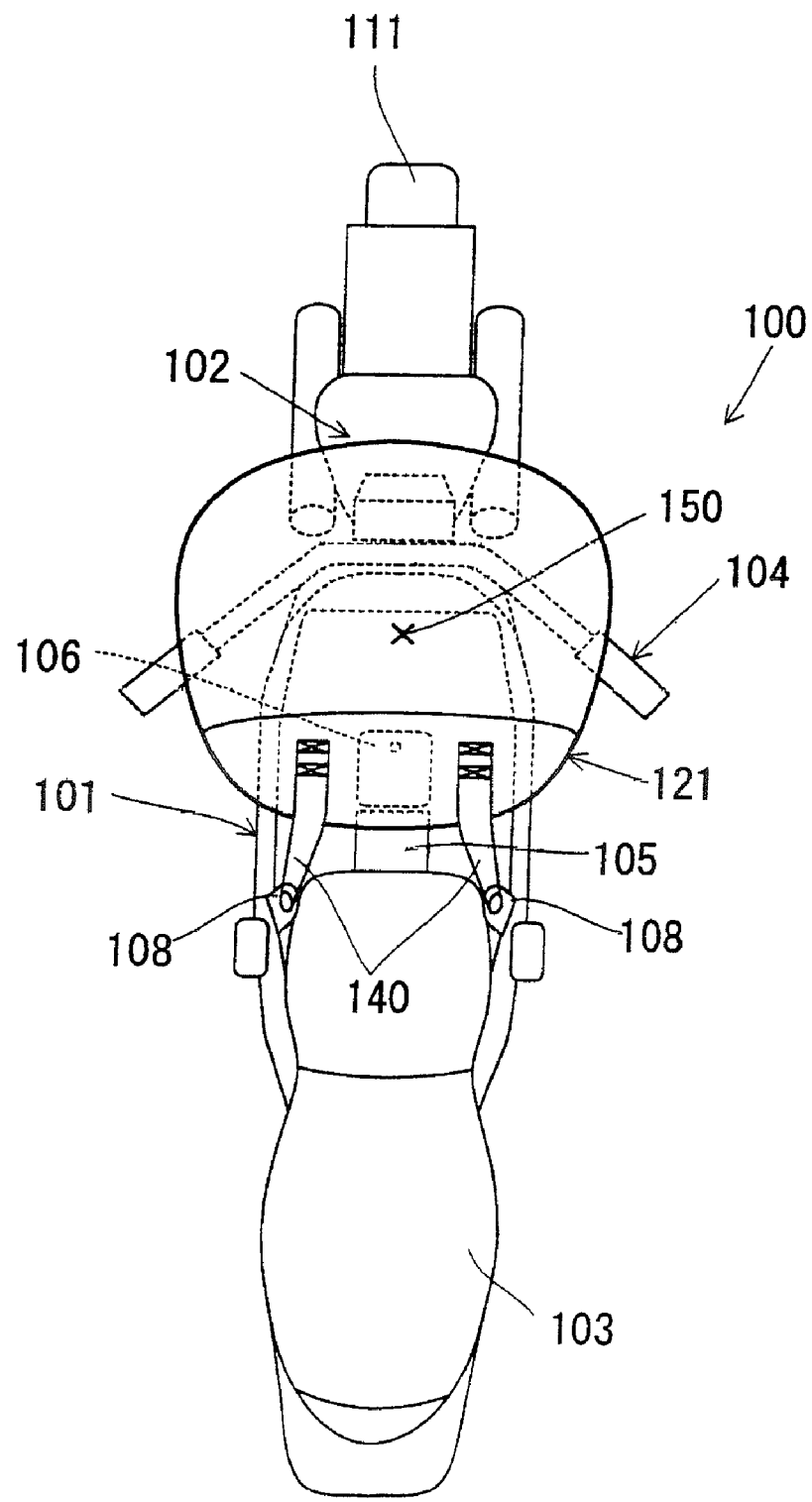
FIG. 18 shows the airbag 121 at the completion of inflation, as viewed from the top of the vehicle.

Referring now to FIGS. 15 to 18, the motion of the airbag apparatus 120 will be described. FIG. 15 shows the state of the airbag 121 of the airbag apparatus 120 at the start of inflation; FIG. 16 shows the airbag 121 at the middle of inflation; and FIGS. 17 and 18 show the airbag 121 at the completion of inflation. Specifically, FIG. 17 shows the airbag 121 at the completion of inflation, viewed from the side of the vehicle; and FIG. 18 shows the airbag 121 at the completion of inflation, viewed from the top of the vehicle.

When the motorcycle 100 comes into a collision in the traveling direction, the occupant is moving (flung) ahead of the motorcycle 100. In the embodiment, upon detection of the frontal collision, the inflator 122 of the airbag apparatus 120 is activated to supply inflation gas generated by the inflator 122 into the airbag 121. This starts the inflation (deployment) of the airbag 121 in the direction of arrow 10 in the airbag apparatus 120 of FIG. 3 in a state before activation. Since inflation gas is continuously fed into the airbag 121, the airbag 121 is expanded in sequence from the retainer 123.

As shown in FIG. 15, with the airbag 121 at the beginning of deployment, the airbag 121 in the process of deployment pushes the top plate 131 of the module cover 130 from below in the retainer 123. Thus the module cover 130 that has received a predetermined deploying force or more from the airbag 121 is torn open along the tear lines (the tear lines 133 and 135) of the erect portion 132. Upon starting the deployment of the airbag 121, the webbings 140 stitched to the airbag 121 is subjected to a tensile load via the first end 141. Thus the webbings 140 pushes open the webbing covers 107 upward to thereby release the covering by the webbing covers 107.

As shown in FIG. 16, with the airbag 121 in the middle of deployment, the module cover 130 torn open along the tear lines further receives the deploying force from the airbag 121 to deploy ahead of the vehicle with the portion of the erect portion 132 adjacent to the front of the vehicle as the hinge. At that time, when a further tensile load is applied to the webbings 140 via the first end 141, the retaining force by the hook-and-loop fastener 144 is canceled, so that the folded state of the folded portions 143 is released. Since the folded portions 143 of the webbings 140 of the embodiment are generally disposed symmetrically, the loads on the airbag 121 by the webbings 140 extending during the deployment of the airbag 121 can be made substantially equal on the right and left, whereby the airbag 121 can deploy bilaterally evenly.

Thus, as shown in FIGS. 17 and 18, the airbag 121 is completely deployed. In this state, the inflated airbag 121 fills the occupant restraining region 150 in front of a rider R in FIG. 17. Thus, the rider R who is moving forward by the kinetic energy of the collision is restrained by the airbag 121 and the impact to the rider R during restraint is reduced.

The webbings 140 fully extend substantially linearly between the airbag 121 and the fastener 108 to restrict the motion of the airbag 121 moving upward and forward of the vehicle by the tension thereof. The fully inflated airbag 121 comes into contact with the front portion 102 at the front of the vehicle, and into contact with the handlebars 104 at both sides. This arrangement stabilizes the restraint of the rider R with the fully inflated airbag 121.

Thus, according to the embodiment, the airbag apparatus 120 to be mounted to the motorcycle 100 employs the webbing holding structure in which the loose portions of the elongated webbings 140 for tethering the airbag 121 to the vehicle body are retained in a predetermined folded state while the airbag apparatus 120 is housed, and in which the hold is released at the deployment of the airbag 121. This arrangement prevents the motion of the webbings 140 from exerting an influence on a desired deployment of the airbag 121, thereby smoothing the deploying motion of the airbag 121. Specifically, when the pair of right and left webbings 140 whose loose portions are retained in the same bunched state are extended from the loose state with the deployment of the airbag 121, the extending motion is smoothed by the hook-and-loop fastener 144, thus preventing the airbag 121 from leaning to the right or left side. Particularly, the use of the hook-and-loop fastener 144 enables the opposing surfaces of the loose portions of the webbings 140 to be freely stuck or peeled off. This arrangement is economical because repeated use is allowed.

Symmetrical location of the folded portions 143 of the right and left webbings 140 makes the load of the webbings 140 applied on the airbag 121 substantially even on the right and left sides, thus enabling the airbag 121 to be deployed laterally evenly in balance.

According to the embodiment, the use of the hook-and-loop fastener 144 as a device for retaining the folded portions 143 of the webbings 140 in a predetermined folded state enables the opposing surfaces of the loose portions to be freely stuck or peeled off. This arrangement is economical because repeated use is allowed.

It is to be understood that the invention is not limited to the above-described embodiment, but various applications and modifications can be made. For example, the following applications are possible.

The airbag apparatus 120 of the embodiment has a structure in which the airbag 121 is tethered to the vehicle body with the pair of right and left webbings 140. Alternatively, the invention may employ a structure in which a single (one) webbing (tether) is used to tether the airbag to the vehicle body. In this structure, the webbing extends in the front-back direction substantially at the center between the airbag and the occupant. The loose portion of the single webbing while the airbag is housed is retained in a predetermined bunched state. For a holding device that releases the hold on deployment of the airbag, the airbag apparatus includes a hook-and-loop fastener that freely sticks and peels the opposing surfaces of the loose portion with a pile structure; a stitched portion that the loose portion is detachably sewn up; and a binding portion detachably binding the loose portion. These arrangements can also prevent a single webbing whose loose portion is retained in a bunched state from restricting the deployment of the airbag by smoothing the extending motion of the webbing from the loose state using the holding device. These arrangements are suitable for motor scooters having a space that enables the lateral movement of rider's legs between the handlebars and the seat.

While the embodiment has been described with reference to the motorcycle 100 of what is called a touring type, the invention may be applied to other types of motorcycle such as motor scooters having a space that enables lateral movement of the rider's legs between the handlebars and the seat and to motorcycle vehicles other than the motorcycle 100.

While the embodiment has been described about the case in which the airbag apparatus 120 is disposed in front of the fuel tank 106, the position of the airbag apparatus 120 may be varied as appropriate, provided that the airbag 121 can deploy into a desired region in a vehicle collision. For example, the airbag apparatus 120 may be disposed behind or lower than that shown in FIG. 1.

What is claimed is:

1. An airbag apparatus for a motorcycle, the airbag apparatus comprising:
   an airbag for being deployed and inflated during emergency conditions;
   a retainer having a bottom, sides, top so that the retainer has a box-shaped configuration and an interior along which the retainer bottom, sides and top extend, the retainer interior being sized for supporting the airbag therein in a compact configuration thereof;
   a tether for being secured at one end thereof to the airbag in the retainer interior and extending out from the retainer interior for being anchored to the motorcycle and having a predetermined length so that the tether generally is loose along its length and not subject to tension forces from the attachment thereof to the airbag prior to airbag deployment and is subject to tension forces upon airbag deployment;
   a cover for the tether separate and spaced from the box-shaped retainer for being mounted to the motorcycle to extend along and above the tether with the tether extending in a space between the cover and motorcycle;
   a predetermined folded portion of the tether outside of the retainer interior having a predetermined folded configuration thereof so that an upper section of the predetermined folded tether portion is closer to the cover directly thereabove than a lower section of the predetermined folded tether portion with a lower surface portion of the upper section facing and overlapping an upper surface portion of the lower section so that the lower and upper surface portions are in opposing relation to each other; and
   a temporary holding device for the predetermined folded tether portion distinct from the cover and motorcycle, the temporary holding device being located between the lower and upper surface portions and configured to keep the upper and lower sections of the predetermined folded tether portion connected in the predetermined folded configuration thereof with a low strength connection therebetween prior to airbag deployment and to release the predetermined folded tether portion from the predetermined folded configuration upon airbag deployment with the temporary holding device not needing the strength thereof to resist tension forces from the airbag supported in the retainer interior prior to airbag deployment.

2. The airbag apparatus of claim 1 wherein the temporary holding device includes a hook-and-loop fastener that secures the opposing surface portions of the tether portion sections together in the predetermined folded configuration thereof.

3. The airbag apparatus of claim 1 wherein the temporary holding device includes stitches in the predetermined folded tether portion that keep the predetermined folded tether portion in the predetermined folded configuration thereof.

4. The airbag apparatus of claim 1 wherein the temporary holding device includes a binding member that detachably binds the predetermined folded tether portion in the predetermined folded configuration thereof.

5. The airbag apparatus of claim 4 wherein the binding member comprises adhesive tape.

6. The airbag apparatus of claim 1 wherein the tether comprises two tethers symmetrically located on opposite sides of the motorcycle.

7. The airbag apparatus of claim 1 wherein the tether comprises two elongated tethers, and corresponding temporary holding devices with the tether temporary holding devices located at the same position along the length of the respective tethers for smooth and even deployment of the airbag.

8. The airbag apparatus of claim 1 wherein the temporary holding device comprises a surface fastener that allows the opposing sections to be freely stuck together or peeled apart from one another.

9. The airbag apparatus of claim 8 wherein the surface fastener comprises one of an adhesive tape and a hook-and-loop fastener.

10. A motorcycle comprising:

a body including a seat for a rider, the body having a central fore-and-aft axis;

a fuel tank of the body in front of a front portion of the seat, the fuel tank being located centrally along the body so that the fore-and-aft axis extends centrally therethrough;

an airbag module in front of a front portion of the fuel tank so that the body does not have a large, upwardly opening space between the seat front portion and the airbag module;

an airbag of the airbag module for being deployed and inflated upon detection of a collision of the motorcycle with the inflated airbag having opposing forward and rearward exterior surfaces thereof such that the rearward exterior surface faces the rider with the airbag inflated;

an inflator for supplying inflation gas to the airbag;

a retainer of the airbag module for housing the airbag prior to deployment thereof;

a pair of elongated tethers each having opposite ends;

the opposite ends of the tethers including secured ends that are each symmetrically attached to the airbag rearward exterior surface spaced from each other on either side of the fore-and-aft axis;

the opposite ends of the tethers further including anchored ends that are each symmetrically anchored to the motorcycle body below the front portion of the seat on either side of the fore-and-aft axis;

the pair of the tethers extending symmetrically relative to each other along the motorcycle body in a generally smooth curved path between the respective secured and anchored ends thereof on either side of the fore-and-aft axis so that the tethers extend upwardly from the anchored ends, along either side of the centrally located fuel tank spaced therefrom and closely adjacent thereto, and forwardly to the airbag module and airbag thereof in front of the fuel tank;

a pair of tether covers that extend symmetrically relative to each other along the motorcycle body over and along the tethers spaced from each other on either side of the fore-and-aft axis and spaced from and closely adjacent to the fuel tank on either side thereof;

an intermediate folded portion of each of the tethers between the ends thereof so that there are opposing sections of each of the intermediate folded portions that are folded onto each other in a folded state thereof; and a tether holder of each of the tethers for holding the opposing sections of the intermediate folded portion in the folded state while the airbag is housed in the retainer to reduce the looseness in the tethers, with the tether holders being operable during a airbag deployment so that the tethers open the covers and are extended out therefrom substantially evenly to keep loads applied to the deploying airbag by the tethers substantially equal.

11. The motorcycle of claim 10 including a pair of through holes in the retainer with the pair of tethers extending through respective ones of the pair of through holes to the exterior of the retainer.

12. The motorcycle of claim 11 wherein the pair of tethers substantially extend in parallel between the ends secured to the airbag and the ends secured to the body to restrict motion of the deployed and inflated airbag.

13. The motorcycle of claim 10 wherein the folded intermediate portions of the tethers are located outside of the retainer.

14. The motorcycle of claim 10 wherein the tether holder includes a releasable fastener that temporarily secures the tether intermediate portion in the folded state, with the fastener configured to release upon deployment of the airbag.

15. The motorcycle of claim 14 wherein the releasable fastener comprises a hook-and-loop fastener that secures together opposing surfaces of the intermediate folded portion of the tether.

* * * * *